(12) United States Patent
Murray et al.

(10) Patent No.: US 6,385,513 B1
(45) Date of Patent: May 7, 2002

(54) SATELLITE EMERGENCY VOICE/DATA DOWNLINK

(75) Inventors: William W. Murray, Roanoke, TX (US); John Cessna, Overland Park, KS (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/444,540

(22) Filed: Nov. 22, 1999

Related U.S. Application Data

(60) Provisional application No. 60/111,508, filed on Dec. 8, 1998.

(51) Int. Cl.[7] .............................. G06F 7/70; G08B 21/00
(52) U.S. Cl. ........................................... 701/14; 340/945
(58) Field of Search .............................. 701/14, 15, 16, 701/17, 18, 200; 342/33, 34, 35, 36, 37, 29; 340/945, 947, 951, 971, 973; 244/76 R

(56) References Cited

U.S. PATENT DOCUMENTS

| | | | |
|---|---|---|---|
| 5,714,948 A | * | 2/1998 | Farmakis et al. ............ 340/961 |
| 5,796,612 A | * | 8/1998 | Palmer ................. 364/424.013 |
| 6,154,637 A | * | 11/2000 | Wright et al. .................. 455/66 |

* cited by examiner

*Primary Examiner*—Yonel Beaulieu

(57) ABSTRACT

A satellite emergency voice/data downlink method and apparatus that sends cockpit audio and flight data to a satellite communications system upon detection of a serious event or a pilot generated signal.

16 Claims, 5 Drawing Sheets

SATELLITE EMERGENCY VOICE/DATA DOWNLINK

This application claims the benefit of U.S. Provisional Application Serial No. 60/111,508, filed in the names of Bill W. Murray and John Cessna on Dec. 08, 1998, the complete disclosure of which is incorporated herein by reference.

FIELD OF THE INVENTION

The present invention relates to cockpit voice recorders and flight data recorders, and in particular to a downlink system for transmitting cockpit audio and critical flight data parameters to a satellite communications system upon detection of a serious event or detection of a pilot generated signal.

BACKGROUND OF THE INVENTION

Larger aircraft are equipped with ground proximity warning devices (GPWS), such as that disclosed in U.S. Pat. No. 3,946,358, the complete disclosure of which is incorporated by reference herein. The GPWS devices process input received from an air data computer and radio altimeter found as separate discrete devices aboard the aircraft. The GPWS alerts the pilot to unsafe flight conditions such as proximity to terrain and illogical combinations of airspeed, altitude and aircraft configuration. Larger aircraft are also equipped with an additional discrete piece of hardware known as a flight data recorder (FDR), such as that disclosed in U.S. Pat. No. 5,508,922, U.S. Pat. No. 4,729,102 and U.S. Pat. No. 4,644,494, the complete disclosures of which are incorporated by reference herein, that further enhances the safety of flight operations. The flight data recorder, or "black box", records various parameters, including the aircraft configuration, altitude and airspeed, received from multiple sensors located throughout the aircraft. Larger aircraft are further equipped with cockpit voice recorders (CVR), such as that disclosed in U.S. Pat. No. 5,627,753, the complete disclosure of which is incorporated by reference herein. The cockpit voice recorder provides an audio record of the cockpit activity during flight, including radio transmissions. The recorded cockpit audio and critical flight data is useful for determining the cause of accidents or for monitoring the performance of an aircraft pilot and crew as well as an individual aircraft and its component parts. The recorded data thus aids in accident prevention by identifying possible changes in flight operations, aircraft component design and maintenance that improve flight safety.

The ground proximity warning devices, flight data recorder, and cockpit voice recorders are designed for larger aircraft and are generally unsuitable for use in smaller general aviation airplanes. For example, the discrete analog circuitry of some GPWS devices and their associated power requirements are incompatible with the power supplies and space/weight limitations of smaller aircraft. In addition, GPWS devices processes input received from an air data computer and radio altimeter found as separate discrete devices aboard the aircraft. These discrete devices are unlikely to be found on smaller general aviation aircraft due to the additional space and weight required to house them. Furthermore, the complicated design and manufacture of these sophisticated devices makes their cost prohibitive to owners of smaller, general aviation airplanes.

The flight data recorder and its complicated array of sensors are also too bulky and expensive to be suitable for use on smaller aircraft. As described in U.S. Pat. No. 5,508,922, the complete disclosure of which is incorporated by reference herein, the survivability requirements placed on the flight data recorder crash survivable protective enclosure add to the cubic volume of the recorder. U.S. Pat. Nos. 5,123,538; 5,407,505 and 5,438,162, the complete disclosures of which are incorporated by reference herein, define large volume and weight necessary to satisfy the survivability requirements placed on the crash survivable protective enclosures. In addition to the survivability requirements placed on the flight data recorder housing, the size of the tape drive or disc and associated circuitry also adds to the cubic volume of the recorder. The power requirements of this circuitry is also incompatible with the power available on a smaller aircraft.

U.S. patent application Serial No. 08/599,735, entitled "Terrain Warning System" and filed on Feb. 12, 1996 in the names of Snyder, et al, the complete disclosure of which is incorporated by reference herein, discloses an alerting system of an appropriate size, weight and cost for general aviation aircraft. The disclosed flight safety device provides the pilot with alerts of various predetermined flight conditions, including terrain proximity warnings, altitude call-outs and improper gear/flap configuration. The disclosed flight safety device includes a flight data recorder for recording multiple aircraft data, including the aircraft altitude, and/or other aircraft data. The device is designed and sized such that it can be mounted as an integral unit in the instrument panel of the aircraft.

Other ground proximity warning devices, flight data recorder, and cockpit voice recorders are designed for use in rotary wing aircraft, such as helicopters. For example, each of U.S. Pat. No. 5,666,110 and U.S. patent application Ser. No. 08/844,116, entitled "Systems and Methods for Generating Altitude Callouts for Rotary Wing Aircraft" and filed on Apr. 29, 1997 in the names of Paterson, et al, the complete disclosures of which are incorporated by reference herein, disclose warning devices for receiving altitude and flight condition signals and indicating the aircraft altitude to the pilot. U.S. Pat. No. 5,383,133, the complete disclosure of which is incorporated by reference herein, discloses a system for providing vibration reduction and health monitoring for a rotary wing aircraft, the system collecting flight data from multiple on-board sensors into a diagnostic computer coupled to a flight control device that includes a provision for downloading the data to a ground station.

Although cockpit voice recorders and flight data recorders for larger aircraft are built to withstand extreme conditions that can occur during violent crashes, the cockpit voice recorder or flight data recorders recovered from some airplane crashes fail to record the critical last few minutes of the flight. One reason these devices failed to record voice or data information was a catastrophic disconnects of the information or power supplied to those devices. The flight data recorders used in smaller general aviation aircraft and rotary wing aircraft are smaller and less costly than those in larger aircraft and, as a result, are less likely to survive a crash. Another disadvantage of cockpit voice recorders and flight data recorders is that recovery can be delayed by the environment where the airplane crashed, such as the ocean.

There exists a need to be able to quickly receive voice and flight information of aircraft that have crashed. Also, there is a need to ensure that the voice and flight information is recorded to the very end of the flight.

U.S. Pat. No. 5,890,079 attempts to satisfy need by disclosing a system that replaces existing flight data recorders with a remote monitoring and recordation system. U.S. Pat. No. 5,890,079, the complete disclosure of which is incorporated by reference herein, discloses a system that monitors aircraft performance parameters and broadcasts the data, along with aircraft identification information, audio, video, global positioning and altitude data, to a world wide two-way radio frequency network for monitoring and recording at a remote, centralized location. The disclosed system fails to recognize the limited band width provided by state of the art airborne communications systems and the concomitant restriction on downlink data rate per channel. Although current satellite and ground station antennas are capable of receiving transmissions of all of the data stored on the flight data recorder and cockpit voice recorder, a communications system capable of downlinking so much data would require an antenna having a bandwidth matching that of the target communications satellite or ground station antenna. Such an antenna is not practical given the current state of the art of airborne communications devices. For example, an antenna having a bandwidth matching that of the communications satellite or ground station antenna would be impracticably large, for example, as large as the aircraft cross-section. Rather, state of the art airborne communication systems typically operate with a weight, size and cost-conscious low profile antenna. Thus, state of the art airborne communication systems typically provide only a 9600 baud rate transmission capability, which severely limits the amount of data that can be downlinked to a communications satellite or ground station. Each of U.S. Pat. No. 4,729,102 and U.S. Pat. No. 5,383,133 also provides means for downloading recorded flight data to a ground station, but each fails to recognize the restrictions placed on downlink capability by current state of the art airborne communications systems and attempts to download more data than the relatively slow datalink can accommodate in a reasonable period of time.

The period of time available for downloading data in critical situations depends upon the elapsed time between the first indications of a threatening event and the loss of transmission capability. Air crashes may occur several minutes to an hour or more after the threatening event, but may also occur within mere seconds. Critical data must be transmitted before the aircraft losses the ability to communicate. State-of-the-art flight data recorders and cockpit voice recorders are restricted to collecting and storing preselected voice and flight data for later analysis. What is needed is a means of ensuring that meaningful data is available in a ground-based repository for later analysis. Another need is a means of monitoring the available data and determining which data are critical and when to transmit that data, thereby ensuring that meaningful data is transmitted in a timely fashion.

SUMMARY OF THE INVENTION

The present invention overcomes the limitations of the prior art by providing a means of ensuring that meaningful data is available in a ground-based repository for later analysis. The present invention further overcomes the limitations of the prior art by providing a means of monitoring the available data and determining both which data are critical and when to transmit that data, thereby ensuring that meaningful data are transmitted in a timely fashion.

According to one aspect of the invention, a method is provided for transmitting voice and flight parameter data, the method including monitoring one or more flight parameters, determining the presence of an abnormal condition, and initiating a downlink of one or more cockpit audio data and flight data in response to determining an abnormal condition. Additionally, the method of the invention includes initiating a data downlink responsive to the activation of an event marker.

According to one aspect of the invention, the determining of an abnormal condition further includes determining one or more of several predetermined emergency conditions and/or one or more other serious events.

According to one aspect of the invention, the downlink is made using one or more on-board communications systems, such as a conventional telephone-based satellite communication system as well as any available radio data link, such as a high frequency (HF) data link, a very high frequency (VHF) data link, and an ultra high frequency (UHF) data link, to transmit the flight data parameters to a ground-based data storage center.

According to one aspect of the invention, the operability of each of on-board communications system is determined and the flight data are arranged into data packets for transmission as a function of which on-board communications systems are operable. Different ones of the data packets are assigned to different ones of the operable on-board communications systems.

According to yet another aspect of the invention, the invention provides an airborne distress link device embodying the above method. The device is configured either as a stand-alone unit or as a component of another avionics device, i.e., as an algorithm operating on a processor embedded in another avionics device having access to the triggering signals and sufficient processing capacity to operate the algorithm in addition to the device's normal function.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the FIGURES, like numerals indicate like elements.

The present invention is an emergency voice/data downlink system utilizing one or more air-to-ground communications systems, including for example, a typical telephone-based satellite communications system.

Low orbit satellite communications system providing affordable worldwide voice and data communications are known and commercially available from many manufacturers. One example, the AlliedSignal AIRSAT™ communications system disclosed in a 1998 sales brochure, is in intended for both cabin and flight deck use. Satellite communications systems, including the AlliedSignal AIRSAT™ system and conventional satellite communication systems, use an orbiting satellite network to allow the user to send and receive telephone transmissions literally anywhere in the world. Such satellite communications systems specifically developed for airborne use are light and compact and are equipped with an array of standard interfaces. Such communications systems are typically compliant with the global Communications, Navigation, Surveillance, and Air Traffic Management (CNS/ATM) system now being implemented, and further support both voice and data transmissions, including such standard GSM telephone capabilities as voice mail, call forwarding and worldwide messaging, PC data, packet data, fax and Airborne Communications Addressing and Reporting System (ACARS) transmissions.

Figure 1:
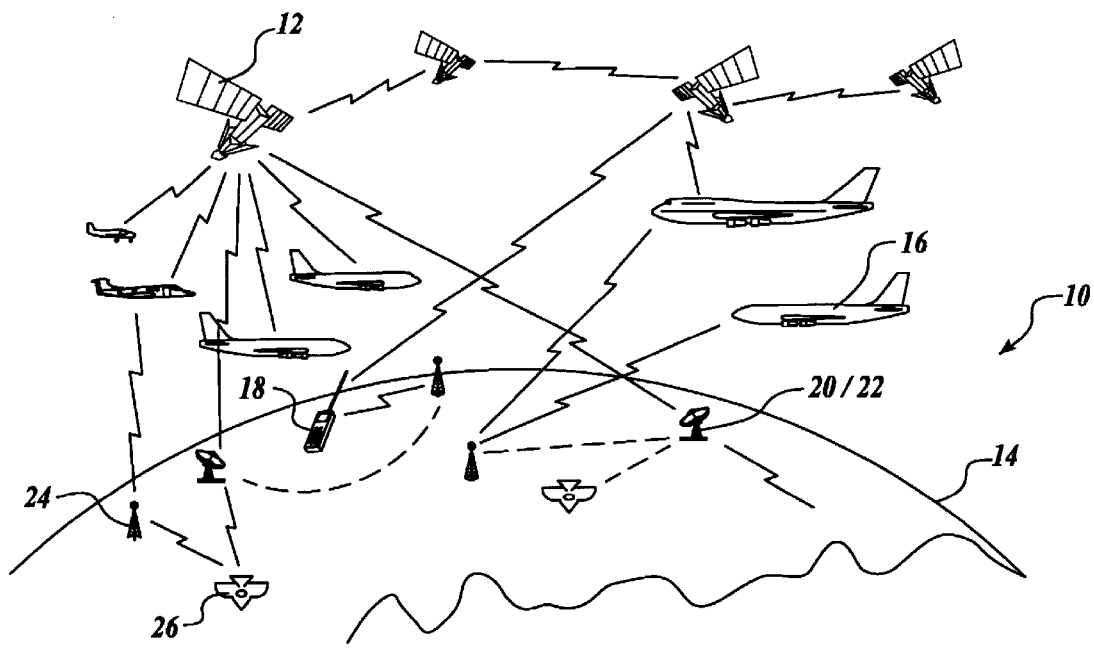
FIG. 1 illustrates a satellite communication system, including a constellation of satellites orbiting the Earth under the control of multiple ground-based satellite control systems and multiple user terminals, which include airborne communication equipment resident on multiple aircraft and multiple handsets that are physically similar to those used for cellular communication.

FIG. 1 illustrates a satellite communication system 10, including a constellation of satellites 12 orbiting the Earth 14 and the user terminals, which include airborne communication equipment resident on multiple aircraft 16 and multiple handsets 18 that are physically similar to those used for cellular communication. Satellites 12 are controlled via multiple satellite control systems 20, which are either combined with a ground-based set of gateways 22 (as shown) or physically separated, depending upon the manufacturer's implementation.

Satellites 12 route calls to ground-based gateway stations 22. Gateway stations 22 provide call processing and control activities such as user terminal validation and access control for all calls placed in the territory covered by gateway 22. Gateway stations 22 also provide interconnection between the world's Public Switched Telephone Networks (PSTNs) and satellite communication system 10 by connecting transmissions made through the system to and from the local Public Switched Telephone Networks. Gateway stations 22 communicate with the space segment, i.e., satellites 12, via gateway link antennas on each satellite 12 and ground-based antennas at each terrestrial gateway facility. Each gateway facility 22 typically includes antennas, a controller 20 to manage communications with the constellation, an operations center to perform local network management, a paging message origination controller, and a switch that connects gateway 22 to Public Switched Telephone Networks within the gateway territory. Each gateway 22 includes a user database used in call processing activities such as user validation. Each gateway 22 also keeps a record of all traffic in its territory. Satellite communication system 10 typically supports mobile telephony, data, and messaging services to user terminals, such as individual subscriber units (ISUs), message termination devices (MTDs), multiplexed units (MXUs), and aeronautical terminals.

Satellites 12 include antennas and transmit/receive modules and form the main mission antenna subsystem. The main mission antenna subsystem communicates with user terminals through tightly focused antenna beams that form a continuous pattern on the Earth's surface. Satellites 12 project 'spot' beams onto the surface of the Earth collectively covering the globe. Typically, system architecture provides transmission hand-off that allows the communications link with user terminals to be transferred from beam to beam and from satellite 12 to satellite 12, as the satellites move over the area where the user terminal is located.

Typically, each satellite 12 has multiple antennas that are cross-linked to allow each satellite 12 to communicate and route traffic to neighboring satellites 12. Such inter-satellite networking permits satellites 12 in the constellation to send traffic from one to another, thus providing system reliability and capacity. Inter-satellite networking provides access to satellite communication system 10 for transmitting or receiving communications irrespective of location of gateway 22 by routing a transmission from satellite 12 to satellite 12 until the transmission is connected to the gateway 22 that is most appropriate for the destination of the particular transmission. This feature also enhances the reliability of satellite communication system 10 by permitting satellite communication system 10 to route calls around gateways 22 or satellites 12 in the event of a malfunction, emergency, or other operational requirement. The aeronautical specific features of satellite communication system 10 include safety and non-safety communication services for the aircraft cockpit and the cabin, but also supports circuit mode services such as voice and data, as well as packet mode data to support Addressing and Reporting System (ACARS) transmissions and aeronautical telecommunications network (ATN) services. ACARS transmissions are alternatively routed directly to a nearby ACARS ground station 24. One or more of the known satellite communication systems 10 implements a priority/precedence/preemption scheme in gateways 22 and aeronautical terminals in aircraft 16 to enable safety services.

One or more of the known satellite communication systems 10 are able to deliver the communications content between aircraft 16 and the ground-based personnel by one or more different physical media to provide communications for Air Traffic Services (ATS) and Airline Operational Control (AOC). Alternatively, satellite communication systems 10 delivers the communications content between aircraft 16 and any public or private ground-based installation 26, for example, Iridium® Aeronautical Ground Station (AGS). The link from the satellite constellation to any of ATS, AOC, and another public or private ground-based installation 26 is established via one of the system gateway/ ground stations and the International Switching Center, which is connected to the Public Switched Telephone Network (ISCJPSTN), or through private networks. Alternatively, one or more of the known implementations of satellite communication systems 10 permit the satellite constellation to connect directly with ATS or AOC personnel via single or multi-channel access units, which can provide very direct controller-to-pilot or airline-to-flight crew communications.

Figure 2:
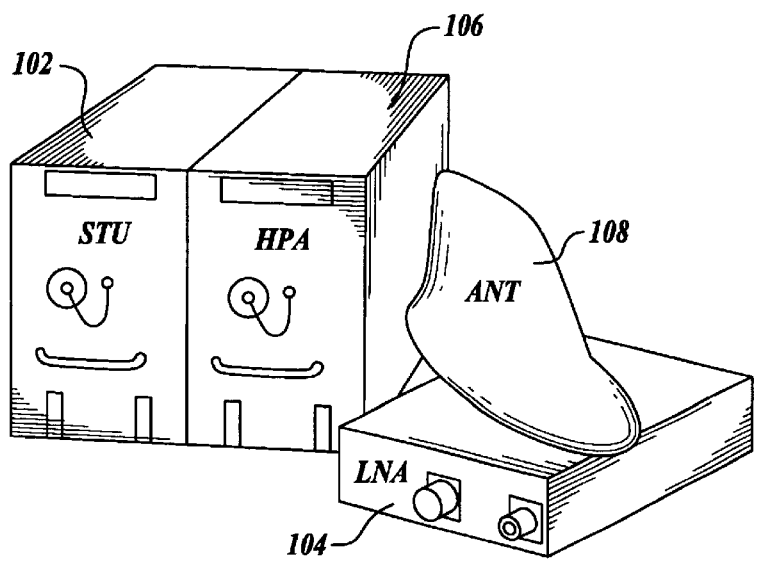
FIG. 2 shows the avionics forming one typical implementation of satellite communication system for commercial air transport aircraft.

FIG. 2 shows the avionics forming one typical implementation of satellite communication system 10 for commercial air transport aircraft 16. The avionics forming the airborne communication equipment portion 100 of this specific implementation of satellite communication system 10 include, for example, a satellite terminal or telecommunications unit (STU) 102; a low noise amplifier (LNA) or diplexer low noise amplifier (DLNA) 104, depending upon the specific embodiment; a high power amplifier (HPA) 106; and a low gain antenna (ANT) 108. According to at least one implementation of a satellite communication system 10, each of the avionics are fully compliant with ARINC Characteristic 761, Second Generation Aviation Satellite Communication System, and ARINC Characteristic 746, Cabin Communications System.

Figure 3:
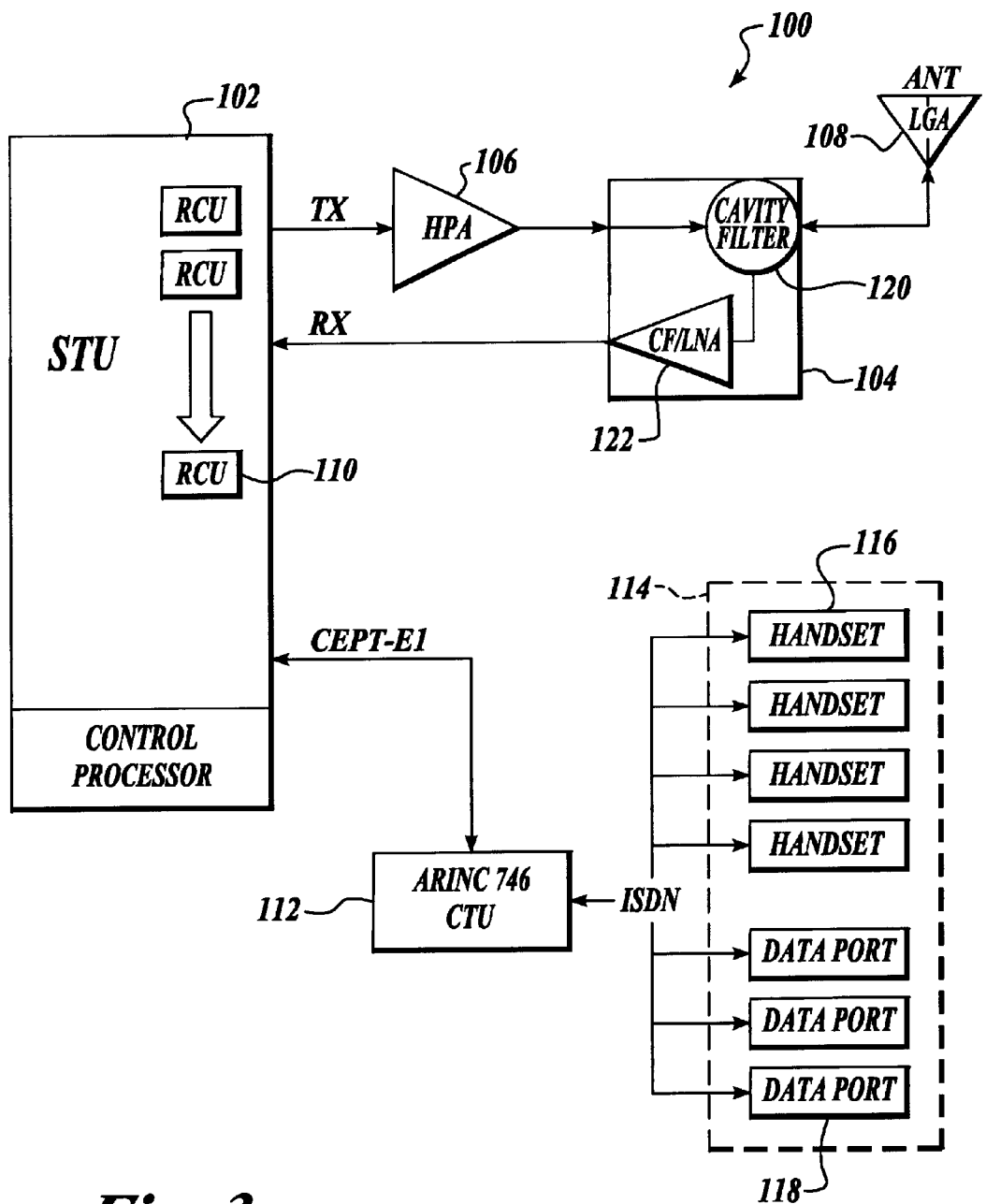
FIG. 3 illustrates a block diagram of the specific implementation of the airborne communication equipment portion of satellite communication system shown in FIG. 2, which provides worldwide continuous multi-channel voice and data communications for commercial air transport aircraft.

FIG. 3 illustrates a block diagram of the specific implementation of the airborne communication equipment portion 100 of satellite communication system 10 shown in FIG. 2, which provides worldwide continuous multi-channel voice and data communications for commercial air transport aircraft 16. Airborne communication equipment portion 100 of satellite communication system 10 accepts data and voice from various sources onboard the aircraft, encodes and modulates this information to appropriate radio frequency (RF) carrier frequencies, and transmits these carriers to the satellite constellation for relay to the ground. The avionics also receives RF signals from the satellite constellation, demodulates these RF signals, performs the necessary decoding of the encoded messages, and outputs data or voice for use onboard the aircraft by crew members and passengers.

In FIG. 3, airborne communication equipment 100 resident on multiple aircraft 16 includes, for example, satellite terminal or telecommunications unit (STU) 102, which is essentially a mobile switch, allowing several users, including passengers, flight crew and automated avionics systems, to share the radio channel units (RCU's) 110 contained within satellite telecommunications unit 102. Radio channel units 110 are modular radio units which handle all the GSM specific signaling on the L-Band radio frequency link. A typical satellite telecommunications unit 102 supports multiple ARINC 429 interface channels. One specific implementation currently provides 30 voice channels and 30 data channels. Specific proprietary implementations of satellite telecommunications unit 102 support multiple external interfaces, including, for example:

Conference Europeene des Postes et Telecommunications (CEPT-E1) interface to cabin telecommunications unit (CTU) communicating with ARINC Characteristic 746 protocol over a standard ARINC 429 physical layer interface to an Airborne Communications Addressing and Reporting System/communications management unit (ACARS/CMU);

RS-232 Maintenance Port;

ARINC Characteristic 615 Data Loader Interface, either a Portable Data Loader (PDL) or an Airborne Data Loader (ADL) communicating over a standard ARINC 429 physical layer interface;

ARINC 739 interface to a Multipurpose Control and Display Unit (MCDU) communicating over a standard ARINC 429 physical layer interface;

ARINC 429 interface to an on-board inertial reference system (IRS) for position/attitude;

Multi-channel apron management service/audio control panel (AMS/ACP) interface for cockpit voice, or audio panel;

Line replaceable unit (LRU) front panel indicators; and

ARINC 429 interface to Centralized Fault Display System/Central Maintenance Computer (CFDS/CMC) ARINC 429 interface to cabin In Flight Entertainment (IFE) system Satellite telecommunications unit 102 supports cabin communications by, for example, interfacing to an ARINC Characteristic 746 cabin telecommunications unit (CTU) 112 over a high speed serial bus pair operating at 2 megabits per second which can accommodate up to 30 digitized voice channels along with status and control information. Cabin telecommunications unit 112 interfaces with the cabin/passenger telecommunication equipment, such as telephone handsets 114 and data ports 116 via in integrated services digital network (ISDN) 118. Cabin telecommunications unit 112 supplies the traditional private branch exchange (PBX) features for the cabin/passenger telecommunication equipment, such as telephone handsets 114 and data ports 116. Cabin telecommunications unit 112 also functions to provide signal processing, i.e., analog-to-digital and digital-to-analog conversion; dial tone generation; call queuing; and providing status messages, such as, "Please hold; your call is being processed."

A cavity filter (CF) 120 and low noise amplifier 104 switch the transmit (TX) and receive (RX) paths to low gain antenna 108 from satellite telecommunications unit 102. Low gain antenna 108 also amplifies the receive signal to the level required by satellite telecommunications unit 102. The cavity filter/low noise amplifier (CF/LNA) circuit 122 insures that the transmit path is isolated from the receive path during the transmit mode to prevent damage to sensitive low noise amplifier 104. High power amplifier 106 preferably provides sufficient RF power level to antenna 108 to maintain the aircraft Effective Isolation Radiated Power (EIRP) within specified limits. The design of high power amplifier 106 generally accounts for varying cable losses and avoid excessive thermal dissipation. Antenna 108 is a weight, size and cost-conscious low profile, low gain antenna that provides adequate link margins from all reasonable aircraft orientations and satellite orbits.

Figure 4:
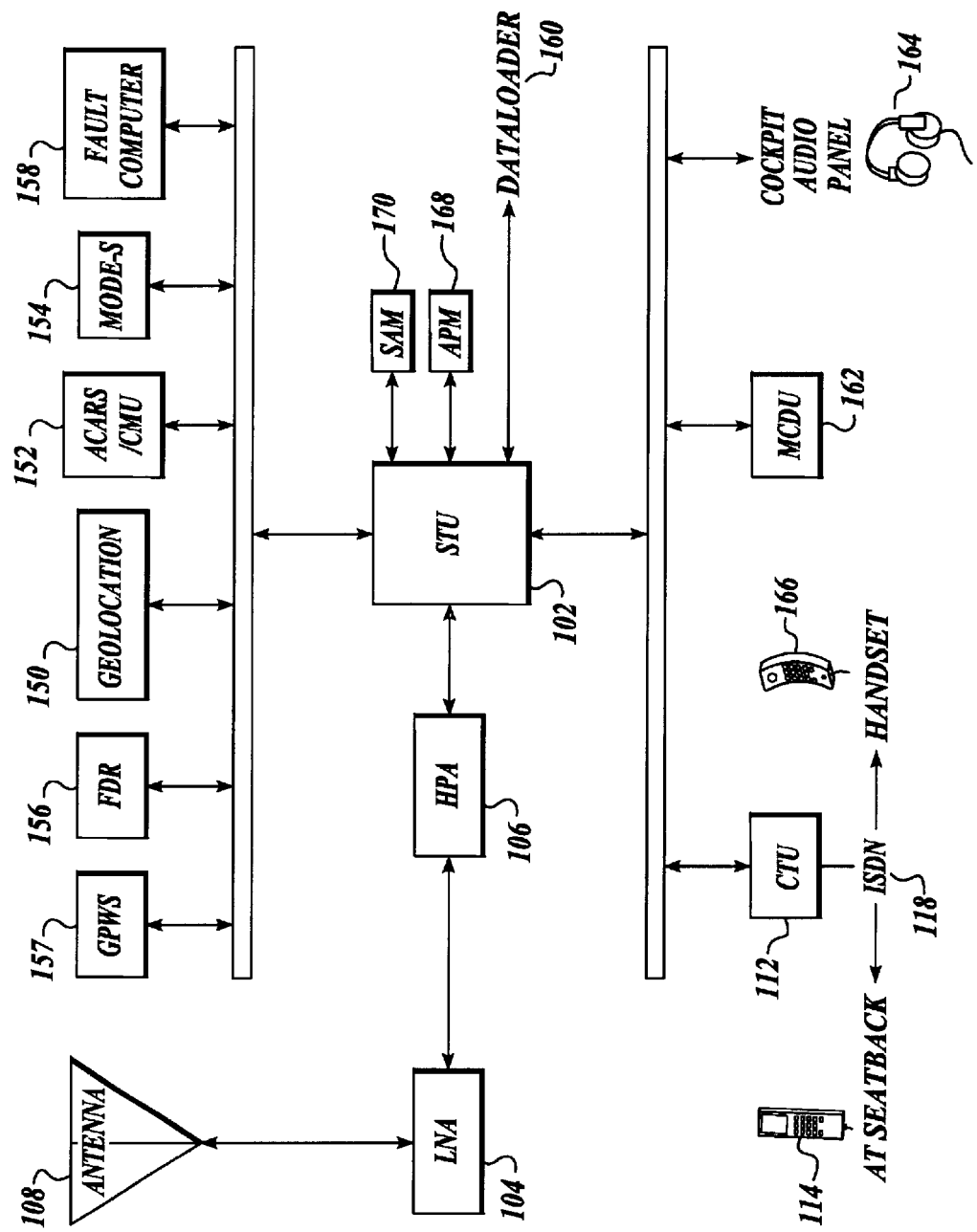
FIG. 4 illustrates the bus architecture supporting airborne communication equipment portion of the specific implementation of satellite communication system shown in FIGS. 2 and 3.

FIG. 4 illustrates the bus architecture supporting airborne communication equipment portion 100 of the specific implementation of satellite communication system 10 shown in FIGS. 2 and 3. As shown, satellite telecommunications unit 102 is coupled to communicate with each of a geolocation device 150, for example, an inertial reference system providing position and attitude data, an Airborne Communications Addressing and Reporting System/communications management unit (ACARS/CMU) 152, a Mode-Select transponder 154, a flight data recorder (FDR) 156, a ground proximity warning device (GPWS) 157, and other flight sensors and warning devices, including Centralized Fault Display System/Central Maintenance Computer (CFDS/CMC) 158, via ARINC interfaces described above. Those of ordinary skill in the art recognize that on-board central fault display system/central maintenance computer 158 generally monitors flight sensors and announces out-of-limit conditions.

Other ARINC interfaces couple satellite telecommunications unit 102 to a data loader 160, a Multipurpose Control and Display Unit (MCDU) 162, and to cockpit audio panel 164 located in the cockpit. Integrated services digital network (ISDN) 118 interface couples satellite telecommunications unit 102 to cabin seatback telephone units 114 through CTU 112. 10 Analog voice handset units 166 are coupled to either cabin telecommunications unit 112 or satellite telecommunications unit 102. Avionics Personality Module 168 provides identification information stored in non-volatile memory and Subscriber Authentication Module 170 contains subscriber identification information.

As illustrated in FIG. 4, Centralized Fault Display System/Central Maintenance Computer (CFDS/CMC) 158 is coupled to each of the flight critical avionics onboard host aircraft 16, such that data describing the current status of on-board systems is available to fault computer 158. Furthermore, as shown in FIG. 4, data from flight critical avionics such as geolocation device 150, Airborne Communications Addressing and Reporting System/communications management unit (ACARS/CMU) 152, Mode-Select transponder 154, Centralized Fault Display System/Central Maintenance Computer (CFDS/CMC) 158, and a flight data recorder (FDR) 156, are available on the data bus and provided to satellite telecommunications unit 102 via ARINC interfaces described above. Thus, flight history data and data regarding specific fault conditions are available, for example, on FDR 156 and fault computer 158, respectively. However, no means are available for monitoring the data and determining when an abnormal condition exists. Furthermore, no means are available for determining that an emergency condition exists, that data should be downlinked for storage in a ground-based repository, when the downlink should take place, and which data should be downlinked.

The present invention provides the means of monitoring voice and flight data and determining when an abnormal condition exists. Furthermore, the present invention provides the means of determining which data are critical and when to transmit the data in the event of an impending catastrophe and ensuring that meaningful data is transmitted before the aircraft losses the ability to communicate. Air crashes may occur several minutes to an hour or more after the threatening event, but may also occur within mere seconds, therefore the invention also prioritizes the available voice and flight data and transmits the data in a timely fashion.

The invention monitors key flight parameters, including warning system outputs, preferably via standard ARINC 429 input channels. The invention includes an input channel coupled to receive the output of one or more warning systems, such as ground proximity warning devices. The invention includes an input channel coupled to receive the out-of-limit announcements generated by on-board central fault display system/central maintenance computer 158. Alternatively or in combination with receiving the out-of-limit announcements generated by on-board central fault display system/central maintenance computer 158, the invention includes one or more additional input channels coupled to directly receive the output of on-board flight sensors, such as cabin pressure status, engine status, hydraulic system status, and other on-board flight sensors as described below. The invention monitors the status of such flight sensors and regularly compares the current status of each to a range of acceptable values and determines any out-of-range conditions. The invention responds to one or more selected warning system outputs, i.e., the out-of-limit announcements generated by on-board central fault display system/central maintenance computer 158 and/or detection of an out-of-range condition of any one or more of selected ones of the flight sensors, and/or a warning of a threat or impending collision by one or more of the on-board ground proximity warning system or a Traffic Alert And Collision Avoidance System (TCAS), by collecting cockpit audio and relevant flight parameter data in to data packets and automatically initiating a downlink of selected ones of the audio and flight parameters data to a ground-based data storage center. Thus, the invention provides a record of cockpit audio and flight data parameters independent of the respective on-board cockpit voice recorder and flight data recorder.

Embodiments of the invention include a processor operating software that automatically initiates the downlink of cockpit audio and critical flight data parameters upon command or detection of a serious event. The ground-based data storage center is any public or private installation, for example, Iridium® Aeronautical Ground Station (AGS). The data is both stored for future analysis and relayed to a public or private emergency response center. For example, the ground-based data storage center relays the voice and data information to the national Air Traffic Control (ATC) center or to AlliedSignal® global data center for human response. The invention is embodied either as a component of a standard satellite communication unit or as a component of another avionics module coupled to the satellite communication unit, such as fault computer 158, shown in FIG. 4, which collects data regarding the status of most or all of the flight systems and on-board flight hardware. Alternatively, the invention is embodied as a separate stand-alone unit. An advantage of the stand-alone unit configuration is that dedicated functionality provides the ability to monitor more potential faults and gather more critical flight parameter data for down link. Furthermore, the stand-alone unit embodiment allows the invention to be configured as a line replaceable unit, or LRU, for ease of replacement, maintenance, and repair.

According to the invention, a multi-channel satellite communication system, for example, above described multi-channel satellite communication system 10, supplements the cockpit voice recorder and flight data recorder. In a preferred embodiment, the airborne distress link portion of the emergency voice/data downlink system of the invention is fitted with both an "Emergency" button or switch available to the pilot and sensors triggered by emergency conditions either of which activate a voice and a data call to the ground-based data storage center through the orbiting satellites of the satellite communication system. The voice call sends cockpit voice and audio data to the ground-based data storage center. The data call preferably sends vital aircraft parameters, including the current status of malfunctioning flight systems, to the ground-based data storage center. According to one or more embodiments of the invention, the transmission of vital aircraft parameters to the ground-based data storage center involves the host aircraft's communications management unit, or CMU. According to one or more embodiments of the invention, the transmission of vital aircraft parameters utilizes all channels of the host aircraft's CMU and provides data in the event of failure of the CVR or FDR.

In the event of an emergency, either the pilot activates the distress mode, i.e., by engaging the "Emergency" switch, or a sensor detects the emergency and automatically activates the distress mode. Emergencies causing the automatic activation preferably include, for example, emergencies such as fire, loss of cabin pressure, as well as other emergency situations described below. In the event the distress mode is activated, the system of the invention places voice and data calls to the ground-based storage center. Cockpit audio data are recorded at the ground-based storage center and predetermined critical ones of the flight data parameters are transmitted via one or more data channels to the ground-based storage center. For example, aircraft position, heading, speed, altitude, and other critical flight parameters are transmitted. Such a transmission supplements an Emergency Locator Transmitter (ELT) by providing position data before the aircraft is lost. The airborne distress link portion of the emergency voice/data downlink system of the invention is preferably coupled to a power bus different from that supplying either the CVR or FDR. Alternatively, the airborne distress link is powered by either an independent power supply, a self-contained power supply, or a combination of power supplies providing constant, uninterrupted power in the event of an emergency. Such power supplies and the means for coupling them to a device intended to operate in an emergency are well known to those of ordinary skill in the art.

Under emergency conditions, the airborne distress link acts in conjunction with the CMU to provide one or more data channels and one or more voice channels to supplement the respective flight data recorder and cockpit voice recorder. Activation of the "Emergency" switch or another event marker triggers a pair of calls, one for voice data and one for flight parameter data, to the ground-based storage center. The ground-based storage center logs the transmitted voice and flight parameter data for future analysis.

Figure 5:
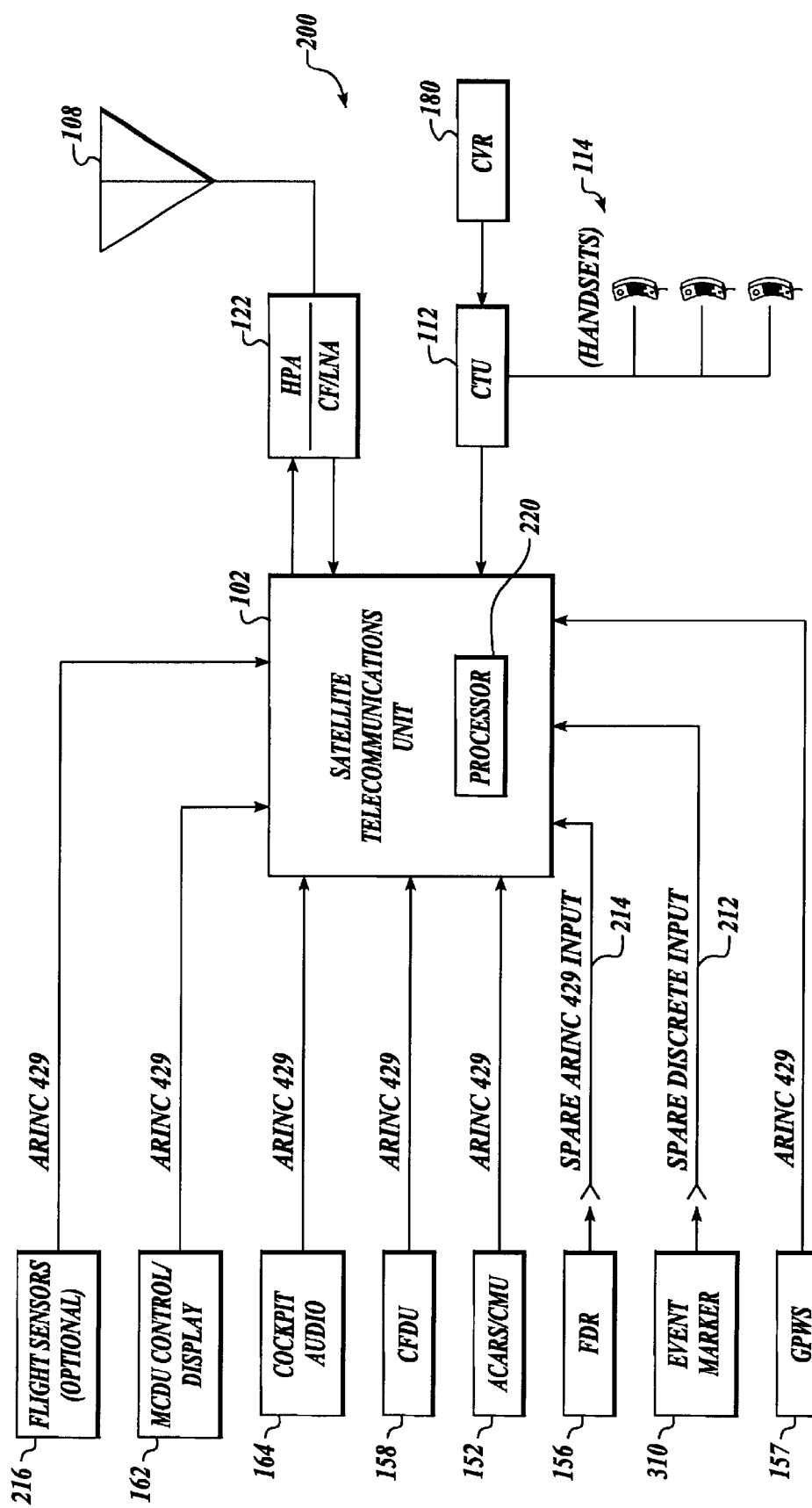
FIG. 5 illustrates the airborne distress link of the emergency voice/data downlink system of the invention embodied as a component of a standard satellite communication unit.

Additionally, the airborne distress link monitors the output of multiple on-board sensors using, for example, an ARINC 429 bus, and automatically activates the satellite data link under emergency conditions, such as loss of cabin pressure or fire. Such automatic activation causes the airborne distress link to downlink flight and voice data by transmitting the data to the ground-based storage center via one of satellites 12. Thus, the emergency voice/data downlink system supplements existing safety products. In such a supplemental mode, the electrical power supplied independently from the CVR and FDR power, as described above, provides added redundancy. Detection of any one or more of several predetermined emergency conditions or events, together known as predetermined "emergency situations," cause the airborne distress link to automatically trigger an emergency datalink to the ground-based storage center. Examples of predetermined emergency situations that automatically trigger an emergency datalink to the ground-based storage center include:

1) Loss of/Sudden change in cabin pressure
   a) Use existing sensor for oxygen masks
   b) Use pressure sensor internal to emergency data link unit/STU 102 (also known as satellite data unit (SDU)
2) Fire/Smoke Detector System resident on Aircraft
3) Engine Failures
   a) Chip Detector
   b) Over temperature/Fire
   c) Unusual Vibration Pattern
   d) Shut down
4) Hydraulic System Failure
   a) Loss of pressure
   b) Over temperature/fire
   c) Flight control system fault
5) Traffic Alert And Collision Avoidance System (TCAS)—Impending Collision Alert
   a) 60 seconds to collision
6) Ground Proximity Warning Computer (GPWS)—Impending Collision Alert
   a) 60 seconds to collision
7) Fuel System
   a) Low Fuel
8) Structural
   a) Stress/Strain monitoring
9) IRS
   a) Sudden excessive Roll/Pitch Yaw
10) Altimeter
    a) Sudden loss of altitude
11) Air Data Computer
    a) Stall
    b) Spin
    c) Slip
12) FMS
    a) Deviation from flight plan
    b) Loss of data from critical system
13) Excessive icing detected
14) Mode S transponder-Emergency codes
15) Data Center activated-Law Enforcement-Hijack
16) Radar
    a) Windshear
    b) Other
17) Background audio abnormalities
    a) loud noise
    b) cessation of air flow
    c) loss of normal background audio signals
18) Failure of FDR
19) Failure of CVR
20) All other Centralized Fault Display System (CFDS) OMC detected faults that are critical FIG. 5 illustrates the airborne distress link 200 of the emergency voice/data downlink system of the invention embodied as a component of a standard satellite communication unit. In FIG. 5, one embodiment of the airborne distress link 200 of the emergency voice/data downlink system includes a satellite telecommunications unit (STU) 102 coupled to high power amplifier (HPA) 106/cavity filter/low noise amplifier (CF/LNA) circuit 122 for amplifying signals received from satellite telecommunications unit 102 and transmitting the amplified signals to antenna 108 for transmission to a targeted satellite 12. Satellite telecommunications unit 102 is coupled to various other systems via standard ARINC interfaces for receiving flight parameter and voice data for transmission, including, for example, cabin telecommunication unit 112 coupled to passenger telephone handsets 114 and data ports 116, multifunctional control display unit 162, ACARS/communication management unit 152, Mode-Select transponder 154, ground proximity warning system 157, central fault display system/central maintenance computer 158, cockpit audio system 164, a spare discrete input 212, a spare ARINC 429 input 214, and other avionics, optionally including direct inputs from one or more flight sensors 216. According to the invention, the host aircraft's flight data recorder (FDR) 156 is coupled through spare ARINC 429 input channel 214, while the pilot's "Emergency" switch or other event marker button is coupled through spare discrete input channel 212. The cockpit voice recorder (CVR) 180 is coupled to satellite telecommunications unit 102 through a spare voice channel via cabin telecommunications unit (CTU) 112.

In the embodiment illustrated in FIG. 5, a pre-existing processor portion 220 of satellite telecommunications unit 102 controlling transmit and receive functions includes sufficient extra processing capacity and capability to operate airborne distress link 200 of the emergency voice/data downlink system of the invention. Pre-existing processor 220 is coupled to each of the host aircraft's flight data recorder through ARINC 429 input 214 and the pilot's event marker button 310 through spare discrete input 212. Processor 220 is coupled to cockpit voice recorder through a spare voice channel. A software algorithm embodying airborne distress link 200 of the invention and operating on processor 220 monitors key flight parameters and warning system outputs as well as the pilot's "Emergency" event marker switch. As described above, alternatively or in combination with receiving the out-of-limit announcements generated by on-board central fault display system/central maintenance computer 158, airborne distress link 200 of the invention is optionally coupled to receive through one or more additional input channels the output of on-board flight sensors 216, including such sensors as cabin pressure status, engine status, hydraulic system status, and other on-board flight sensors as described herein. Airborne distress link 200 monitors the status of such flight sensors and regularly compares the current status of each to a range of acceptable values and determines any out-of-range conditions. In response to detection of any one or more of 1) activation of the pilot's "Emergency" event marker; 2) one of the above predetermined emergency situations; and 3) another serious event, airborne distress link 200 enters a "distress" mode.

In distress mode, airborne distress link 200 automatically causes satellite telecommunications unit 102 to initiate an emergency datalink to the ground-based storage center and downlink cockpit audio and critical flight data from CVR 180 and FDR 156, respectively. According to one embodiment of the invention, upon activation of the distress mode, processor automatically activates satellite telecommunications unit 102 to initiate a downlink of stored cockpit audio and critical flight data to a ground-based data storage center. As noted above, state of the art airborne communication systems are typically restricted to a 9600 baud rate transmission capability, which severely limits the amount of data that can be downlinked to a communications satellite or ground station. Therefore, the data are commonly provided in a terse or compressed format such that large amounts of data to be downlinked through the low speed pipe in a relatively short time period.

Alternatively, the algorithm operating on processor 220 of the invention assigns first priority to a number of voice and flight data; collects the appropriate ARINC labels; positions the labels in a data packet; and ships the data packet to satellite telecommunications unit 102 for downlink to a ground-based data storage center. Thus, the invention downlinks a maximum amount of relevant data in the most timely fashion. Preferably, the algorithm of the invention collects the ARINC labels determined to carry the most critical voice and flight data and places them in the data packet for downlink. As noted above, although air crashes may occur within mere seconds after the threatening event, the aircraft may continue to operate for several minutes to an hour or more. Provided the emergency permits downlinking of further data, i.e., both airborne distress link 200 and the airborne communication equipment portion 100 of satellite communication system 10 continue to function and the emergency condition continues, lower priority data are downlinked and downlinking of the stored critical voice and flight data is repeated. Preferably, if the avionics responsible for providing the voice and flight data is capable of updating the data, those updated data replace the stored data and are downlinked.

Determination of which voice and flight data are deemed most critical and, therefore, placed in the first downlinked data packet and the preferred order is properly coordinated with the National Transportation Safety Board (NTSB), which is responsible for investigating air crashes. However, for purposes of illustration and without intent to limit the scope of the invention, values current at the time of transmission for the following data are placed in the first downlinked data packet: position, heading, altitude, roll, pitch, yaw, and engine status. Provided the emergency permits downlinking of further data, other voice/flight/system data recorded on board the aircraft prior to the download initiation is also downloaded.

Figure 6:
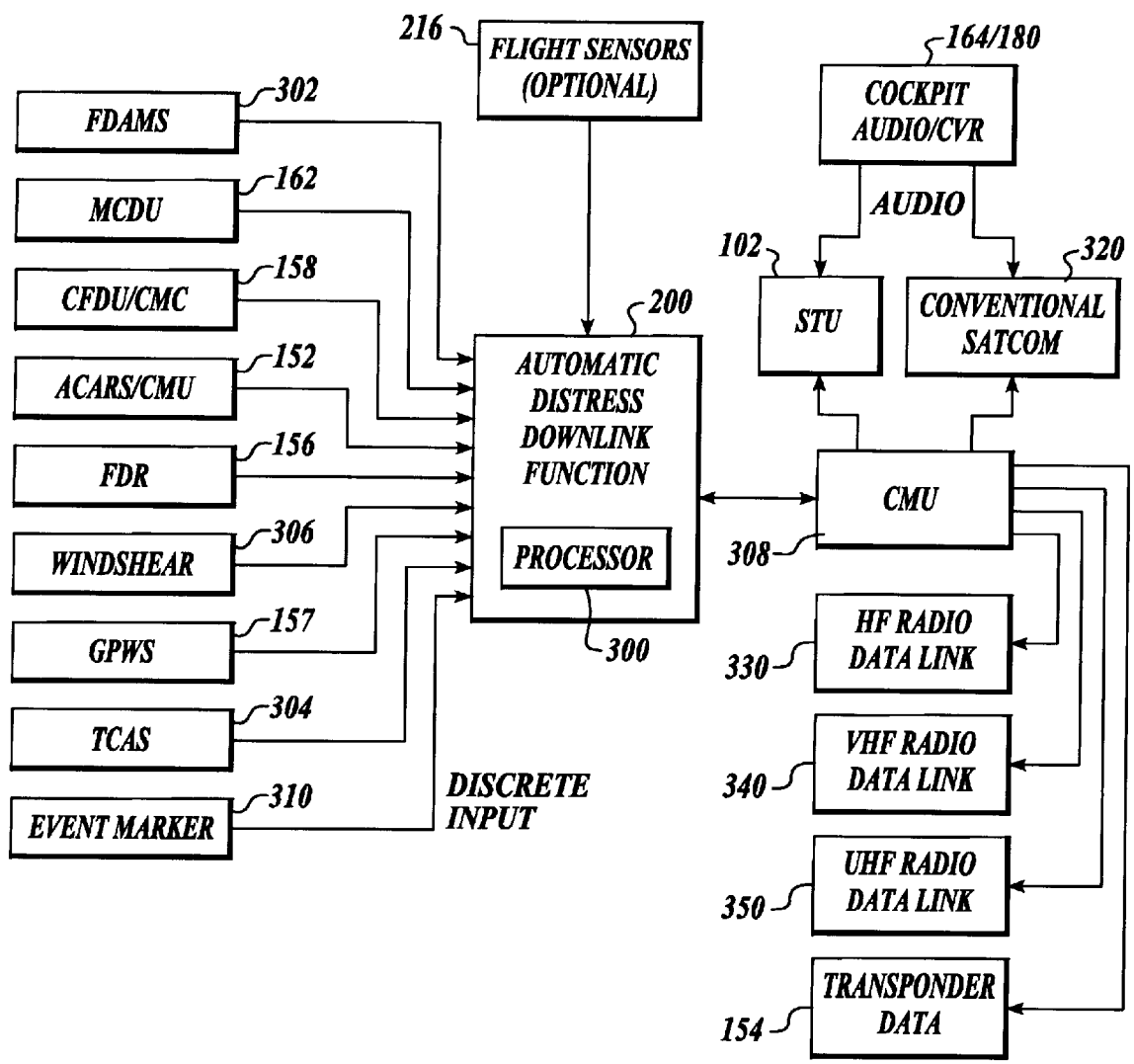
FIG. 6 illustrates the airborne distress link of the emergency voice/data downlink system of the invention embodied as a stand-alone, line replaceable unit receiving input from multiple avionics on-board the host aircraft using multiple channels to transmit voice and flight data via two or more downlink systems.

FIG. 6 illustrates the airborne distress link 200 of the emergency voice/data downlink system of the invention embodied as a stand-alone, line replaceable unit using multiple channels to transmit voice and flight data via two or more downlink systems. In FIG. 6, airborne distress link 200 includes a microprocessor 300 configured independently of any one of the downlink systems. In FIG. 6, microprocessor 300 is configured having multiple input channels coupled to receive data input from one or more of flight critical avionics. For example, microprocessor 300 is coupled to receive data input from one or more of geolocation device 150, Airborne Communications Addressing and Reporting System/communications management unit (ACARS/CMU) 152, Centralized Fault Display System/Central Maintenance Computer (CFDS/CMC) 158, Multipurpose Control and Display Unit (MCDU) 162, cockpit audio panel 164, and flight data recorder (FDR) 156. Additionally, cockpit audio panel 164 and cockpit voice recorder (CVR) 180 are coupled to processor 300 through the aircraft's communications management unit, or CMU 308. Airborne distress link 200 is also coupled to receive input from a pilot event marker 310 for triggering the distress mode of the invention, wherein voice and flight critical data are downlinked via the airborne communication equipment portion 100 of above described satellite communication system 10. Processor 300 also preferably includes multiple output channels, each one coupled through communications management unit 308 to each one of the on-board downlink systems. For example, processor 300 is coupled to one or more of satellite telecommunications unit 102 and other on-board communications systems, including Mode-Select transponder 154; another telephone-based satellite communication system 320, such as that described in U.S. Pat. No. 5,918,155, the complete disclosure of which is incorporated by reference herein; as well as any available radio data link, such as high frequency (HF) data link 330, very high frequency (VHF) data link 340, and ultra high frequency (UHF) data link 350. Communications management unit 308 also couples processor 300 to cockpit audio/cockpit voice recorder 164/180 for downlink directly through one or both of satellite telecommunications unit 102 and other telephone-based satellite communication system 320.

As described above, the software algorithm embodying airborne distress link 200 of the invention and operating on processor 300 monitors key flight parameters and warning system outputs as well as the pilot's "Emergency" event marker switch. Upon detection of any one or more of 1) the pilot's "Emergency" event marker; 2) one of the above predetermined emergency conditions or events; and 3) another serious event, airborne distress link 200 enters a "distress" mode. In the event a distress mode is initiated, processor 300 automatically activates one or more of the available ones of satellite telecommunications unit 102 and other on-board communications systems to initiate a downlink of stored cockpit audio and critical flight data in a compressed format to a ground-based data storage center, as described above.

Furthermore, in a preferred embodiment, the invention operates using two or more output channels, each broadcasting on a different one of the above satellite communications systems and radio data links. Preferably, airborne distress link 200 operating on processor 300 verifies that each satellite communications system and radio data link is currently operable before arranging ones of the of data into data packets for transmission. Having determined the identity of the operable satellite communications systems and radio data links, airborne distress link 200 collects the ARINC labels determined to carry the most critical voice and flight data and arranges the data into packets as a function of the number of operable downlink channels. Airborne distress link 200 assigns different ones of the data packets to different ones of the available, i.e., operable, satellite communications systems and radio data links for downlink. Preferably, redundancy is provided by ordering the same data differently in each different data packet such that the most critical voice and flight data are transmitted by multiple communications systems. Thus, airborne distress link 200 operating on processor 300 assigns first priority to a number of voice and flight data; collects the appropriate ARINC labels; positions the labels in different individual data packets; and, using different ones of the device's multiple channels, ships different ones of the data packets to different ones of the currently operable on-board telephone-based satellite communication systems and radio data link systems for simultaneous transmission. In this way, the invention downlinks a maximum amount of relevant data in the most timely fashion.

Preferably, airborne distress link 200 collects the ARINC labels determined to carry the voice and flight data determined to be most critical and places each of these data in each of the different individual data packets transmitted via different ones of the multiple channels of processor 300 to each of the different ones of the available on-board downlink systems, before transmitting lower priority data. Thus, transmission redundancy is provided for the highest priority voice and flight data. Preferably, the highest priority voice and flight data are arranged in different order in the individual data packets transmitted via different ones of the device's multiple channels to provide the highest probability that such data is successfully transmitted.

Additionally, processor 300 of airborne distress link portion 200 of the invention is preferably coupled to a power bus different from that supplying either the associated avionics modules and communications systems. Alternatively, the airborne distress link is powered by either an independent power supply, a self-contained power supply, or a combination of power supplies providing constant, uninterrupted power in the event of an emergency. Such power supplies and the means for coupling them to a device intended to operate in an emergency are well known to those of ordinary skill in the art.

While the preferred embodiment of the invention has been illustrated and described, it will be appreciated that various changes can be made therein without departing from the spirit and scope of the invention. For example, airborne distress link 200 operating on processor 220 of satellite telecommunications unit 102, shown in FIG. 5, is optionally configured to determine which of the multiple downlink channels of STU 102 are operable and arrange the most critical voice and flight data into different data packets as a function of the number of operable downlink channels, as described above in connection with independently configured processor 300, shown in FIG. 6. Airborne distress link 200 operating on processor 220 optionally assigns different ones of the data packets to different ones of the operable downlink channels of satellite telecommunications unit 102, preferably, while providing redundancy by again ordering the same data differently in each different data packet such that the most critical voice and flight data are transmitted by multiple downlink channels. Furthermore, airborne distress link 200 operating on processor 220 optionally interrupts and overrides transmissions currently operating on downlink channels of STU 102 to downlink ones of the above data packets.

Furthermore, distress link 200 is equally applicable to automotive and other transportation vehicles having on-board radio or telecommunications systems, such as cellular telephones, VHF radios, citizen band (CB) radios, and other conventional communications systems. In such installations, distress link 200 is coupled to receive signals representative of an emergency situation. For example, distress link 200 is coupled to the switch activating the airbag of an automobile, thereby indicating an automobile emergency.

What is claimed is:

1. An airborne distress link apparatus for an airplane having on board one or more communications systems, said apparatus comprising:
   means for establishing an event marker;
   means for detecting an emergency situation; and
   a processor having one or more inputs receiving inputs representative of one or more flight conditions and one or more outputs coupled to one or more on-board communications systems, said processor having an algorithm resident thereon for initiating a downlink of one or more flight data using one or more of said communications systems in response to the activation of said means for establishing an event marker or said means for detecting an emergency situation.

2. The airborne distress link apparatus recited in claim 1, wherein said processor is a component of one of said one or more communications systems.

3. The airborne distress link apparatus recited in claim 1, wherein said processor is a component of one or more avionics modules coupled to one of said one or more communications systems.

4. The airborne distress link apparatus recited in claim 1, wherein said processor is configured as a stand-alone avionics module.

5. A method for transmitting flight data in an aircraft communications device to a ground based data storage center via a satellite communications system and using one or more on-board communications systems, said method comprising then steps of:
   monitoring one or more flight parameters;
   determining an abnormal condition in response to said monitoring step; and
   automatically initiating a downlink of said flight data in response to said step of determining said abnormal condition.

6. The method recited in claim 5, said method further comprising
   arranging said flight data into data packets for transmission by said one or more on-board communications systems and
   determining the operability of each of said on board communication systems.

7. The method recited in claim 5, further comprising the step of activating an event marker and wherein said initiating a downlink is further responsive to an activation of said event marker.

8. The method recited in claim 5, wherein said determining an abnormal condition further comprises determining one or more of a plurality of predetermined emergency conditions.

9. The method recited in claim 5, wherein said initiating a downlink of flight data further comprises initiating a downlink of cockpit audio data.

10. The method recited in claim 5, wherein said one or more on-board communications systems comprise a satellite telecommunications unit, a telephone-based satellite communication system, and a radio data link.

11. The method recited in claim 6, wherein said arranging said flight data into data packets for transmission further comprises arranging said flight data into said data packets as a function of said determined operability of said on-board communications systems.

12. The method recited in claim 11, wherein said arranging said flight data into said data packets further comprises assigning different ones of said data packets to different operable ones of said on-board communications systems.

13. A method in an aircraft communications device for determining a serious event and transmitting flight data in response to the serious event, the method comprising:

receiving one or more signals triggering a distress mode;

collecting flight data into data packets in response to said triggering step; and automatically initiating a downlink of selected ones of said flight data via a satellite communication system and utilizing one or more on-board communications systems.

14. The method recited in claim 13, wherein said one or more signals triggering a distress mode includes one or more of an event marker signal, a signal representative of one of one or more predetermined emergency situations, and a signal representative of another serious event.

15. The method recited in claim 14, wherein said signal representative of one of one or more predetermined emergency situations further comprises a predetermined one or more of out-of-limit announcements generated by an on-board fault computer.

16. The method recited in claim 14, wherein said signal representative of one of one or more predetermined emergency situations further comprises a signal representative of an out-of-limit condition generated by predetermined ones of a plurality of on-board flight sensors.

* * * * *